(12) United States Patent
Hong (10) Patent No.: US 10,609,591 B2
(45) Date of Patent: Mar. 31, 2020

(54) RATE CONFIGURATION METHOD AND DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 32 days.

(21) Appl. No.: 15/805,581

(22) Filed: Nov. 7, 2017

(65) Prior Publication Data

US 2018/0139643 A1 May 17, 2018

(30) Foreign Application Priority Data

Nov. 11, 2016 (WO) .............. PCT/CN2016/105472

(51) Int. Cl.
| H04W 28/02 | (2009.01) |
| H04L 5/00 | (2006.01) |
| H04W 28/12 | (2009.01) |
| H04W 76/16 | (2018.01) |
| H04W 88/06 | (2009.01) |
| H04W 8/24 | (2009.01) |
| H04W 84/04 | (2009.01) |
| H04W 84/12 | (2009.01) |

(52) U.S. Cl.
CPC ....... H04W 28/0215 (2013.01); H04L 5/0053 (2013.01); H04L 5/0064 (2013.01); H04W 28/02 (2013.01); H04W 28/12 (2013.01); H04W 8/24 (2013.01); H04W 76/16 (2018.02); H04W 84/042 (2013.01); H04W 84/12 (2013.01); H04W 88/06 (2013.01)

(58) Field of Classification Search
None
See application file for complete search history.

(56) References Cited

U.S. PATENT DOCUMENTS

| 10,159,062 | B2* | 12/2018 | Yi .......................... H04W 8/22 |
| 2014/0079007 | A1 | 3/2014 | Li et al. |
| 2016/0338068 | A1* | 11/2016 | Cheng ................. H04W 88/06 |

FOREIGN PATENT DOCUMENTS

| CN | 102143589 A | 8/2011 |
| CN | 102833813 A | 12/2012 |
| CN | 103001751 A | 3/2013 |
| CN | 104735785 A | 6/2015 |

(Continued)

OTHER PUBLICATIONS

EP Extended Search Report for EP App. No. 17200748.6 dated Apr. 5, 2018, 9 pages.

(Continued)

*Primary Examiner* — Robert M Morlan
(74) *Attorney, Agent, or Firm* — Arch & Lake LLP (57) ABSTRACT

The present disclosure relates to rate configuration methods and devices. In some embodiments, the method includes: generating indication information that indicates a rate capability supported by an enhanced LTE-WLAN aggregation user equipment (eLWA UE); and reporting the indication information to an LTE base station. The indication information indicates a first rate of the eLWA UE, and the first rate is greater than a second rate configured by a WLAN access point for the eLWA UE.

22 Claims, 4 Drawing Sheets

(56) References Cited

FOREIGN PATENT DOCUMENTS

CN 105592500 A 5/2016
WO WO-2016169583 A1 * 10/2016 .......... H04W 76/026

OTHER PUBLICATIONS

Qualcomm Incorporated: "Report on RAN2 email discussion: [91bis#21][LTE/WiFi] UE capabilities", 3GPP Draft; R2-156781_LTE_WIFI_UE_CAPABILITY_EMAILDISCUSSION_21, vol. RAN WG2, No. Anaheim, CA, USA;Nov. 16, 2015.
Qualcomm Incorporated: "Remaining Open Issues for LWA Control Plane", 3GPP Draft; R2-161497_0PEN_ISSUES_LWA, vol. RAN WG2, No. St. Julian's, Malta; Feb. 15, 2016-Feb. 19, 2016 Feb. 14, 2016.
Oppo: "Discussion on LTE-WLAN capabilities", 3GPP DRAFT; R2-161126_Discusion on LTE-WLAN Capabilities, vol. RAN WG2, No. St. Julian's, Malta; Feb. 15, 2016-Feb. 19, 2016 Feb. 14, 2016.
International Search Report (including English translation) and Written Opinion issued in corresponding International Application No. PCT/CN2016/105472, dated Aug. 1, 2017, 13 pages.
3GPP TSG-RAN2 Meeting #95bis, R2-167112, Kaohsiung, Taiwan, Feedback Enhancements for LWA, Qualcomm Incorporated, Oct. 10-14, 2016, (3p).
3GPP TS 36.306 V14.0.0. 3rd Generation Partnership Project, Technical Specification Group Radio Access Network, Evolved Universal Terrestrial Radio Access (E-UTRA); User Equipment (UE) radio access capabilities, Sep. 2016, (20p).
3GPP TSG-RAN#72 Meeting, Busan, South Korea, Rel-14 LTE: Enhanced LWA, Jun. 13-16, 2016, (3p).

* cited by examiner

RATE CONFIGURATION METHOD AND DEVICE

CROSS-REFERENCE TO RELATED APPLICATION

This application is based upon, and claims priority under 35 U.S.C. § 119 to PCT Application PCT/CN2016/105472, filed Nov. 11, 2016, the entire contents of which are incorporated herein by reference.

TECHNICAL FIELD

The present disclosure relates to the field of communication technology, and more particularly, to a rate configuration method and device.

BACKGROUND

With the continuing development of wireless communication technology, demand for expensive and limited licensed spectrum continues to rapidly increase, which has the potential to limit the usefulness of new wireless communication technology. In order to alleviate demand for licensed spectrum, operators may deploy Wireless Local Area Networks (WLAN) that operates on an unlicensed spectrum to bypass Long-Term Evolution (LTE) services, and reduce traffic over LTE.

At present, LTE and WLAN deployed by the same operator are generally two independently operated networks, and WLAN is often in a low utilization state. Accordingly, the Third Generation Partnership Project (3GPP) has explored enhanced LTE-WLAN Aggregation (eLWA) to deeply integrate LTE and WLAN to facilitate dynamic load balancing between LTE and WLAN. For example, all data from the core network is transmitted to an LTE Evolved Node B (eNB) first, and the LTE eNB determines which data is transmitted to an eLWA compatible user equipment (UE) through the LTE eNB, and which data is transmitted to the eLWA UE through the WLAN Access Point (AP) based on a series of measurement results and pre-configurations. However, the rates at which data can be transmitted through the WLAN AP and the LTE eNB, respectively, are generally dramatically different (e.g., by at least an order of magnitude), which can create difficulties when attempting to simultaneously transmit information using both the WLAN AP and the LTE eNB. For example, if the LTE eNB attempts to transmit data to the eLWA UE at a rate that is lower than the rate at which the WLAN AP communicates with the UE, the full capabilities of the eLWA UE cannot be realized, as the eLWA UE could receive data at a higher rate if it were receiving it exclusively through the WLAN AP. As another example, if the LTE eNB attempts to transmit data to a UE at a rate that is higher than the rate at which the LTE eNB is configured to communicate with the UE, but the UE is not compatible with eLWA, some of the data that was sent via the WLAN AP or LTE connection may be lost if the UE is incapable of simultaneous communication over both connections. Accordingly, new rate configuration methods and devices are desirable.

SUMMARY

In accordance with some embodiments of the disclosed subject matter, rate configuration methods and devices are provided.

In accordance with a first aspect of the disclosed subject matter, a rate configuration method for eLWA UE is provided. The method may include following acts: generating, by the eLWA UE, indication information that indicates a rate capability supported by the eLWA UE; and reporting, by the eLWA UE, the indication information to an LTE base station, wherein the indication information indicates a first rate at which the eLWA UE is capable of receiving data, and the first rate is greater than a second rate configured by a WLAN access point (AP) for the eLWA UE.

In accordance with a second aspect of the disclosed subject matter, a rate configuration method for an LTE base station is provided. The method may include following acts: receiving, at the LTE base station, indication information reported by an enhanced LTE-wireless local area network (WLAN) aggregation (eLWA) user equipment (UE), wherein the indication information indicates a rate capability supported by the eLWA UE; and configuring, by the LTE base station, a first rate for the eLWA UE based on the indication information, wherein the first rate is greater than a second rate configured by a WLAN access point (AP) for the eLWA UE.

In accordance with a third aspect of the disclosed subject matter, a rate configuration device for eLWA UE is provided. The rate configuration device includes: a processor; and a memory configured to store instructions executable by the processor. Execution of the instructions causes the processor to: generate indication information that indicates a rate capability supported by the eLWA UE; and report the indication information to an LTE base station, wherein the indication information indicates a first rate at which the eLWA UE is capable of receiving data, and the first rate is greater than a second rate configured by a WLAN access point (AP) for the eLWA UE.

In accordance with a fourth aspect of the disclosed subject matter, a rate configuration device for an LTE base station is provided. The device includes: a processor; and a memory configured to store instructions executable by the processor. Execution of the instructions causes the processor to: receive indication information reported by an enhanced LTE-wireless local area network (WLAN) aggregation (eLWA) user equipment UE, wherein the indication information indicates a rate capability supported by the eLWA UE; and configure a first rate for the eLWA UE based on the indication information, wherein the first rate is greater than a second rate configured by a WLAN access point (AP) for the eLWA UE.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

The implementations set forth in the following description do not represent all implementations consistent with the invention. Instead, they are merely examples of apparatuses and methods consistent with aspects related to the invention as recited in the appended claims.

Figure 1:
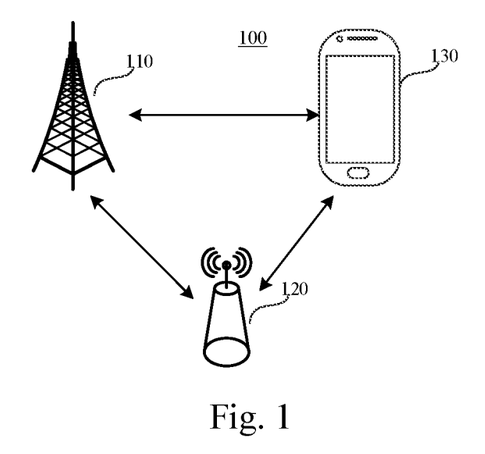
FIG. 1 is a block diagram of a rate configuration system in accordance with some embodiments of the disclosed subject matter.

FIG. 1 illustrates a block diagram of a rate configuration system 100 in accordance with some embodiments of the disclosed subject matter. The rate configuration system 100 can include an LTE base station 110, a WLAN AP 120 and an eLWA UE 130. The eLWA UE 130 can be connected to the WLAN AP 120 and the LTE base station 110, respectively, and a connection can be established between the WLAN AP 120 and the LTE base station 110. Note that the eLWA UE 130 can be a UE that supports eLWA.

As described below in connection with FIGS. 2-8, the LTE base station 110 can receive data from a core of the LTE network (e.g., an Evolved Packet Core, not shown) to be sent to the eLWA UE 130, and can determine which data is transmitted to the eLWA UE 130 via the LTE base station 110, and which data is transmitted to the eLWA UE 130 through the WLAN AP 120 bases on measurement results and pre-configurations. For example, in some embodiments, the LTE base station 110 can be configured to transmit data to the eLWA UE 130 at a first rate that is greater than a second rate at which the WLAN AP 120 is configured to transmit data to the eLWA UE 130. In such an example, the LTE base station 110 can send data to the WLAN AP 120 at the second rate (at which WLAN AP 120 is configured to send data to the eLWA UE 130), and the WLAN AP 120 can send that received data to the eLWA UE 130 at the second rate, while the LTE base station 110 transmits data to the eLWA UE 130 at a third rate based on a difference between the second rate and the first rate. This can facilitate simultaneous communication by the eLWA UE 130 with both the LTE base station 110 and the WLAN AP 120.

Figure 2:
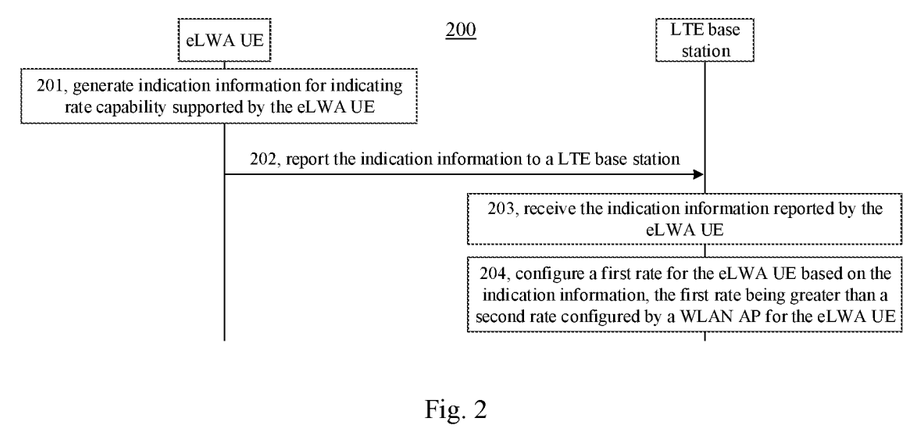
FIG. 2 is a flow chart of a rate configuration process in accordance with some embodiments of the disclosed subject matter.

FIG. 2 is a flow chart of a rate configuration process 200 in accordance with some embodiments of the disclosed subject matter. In some embodiments, process 200 can be used in connection with any suitable rate configuration system, such as rate configuration system 100 described above in connection with FIG. 1. As shown in FIG. 2, the rate configuration process 200 can begin at 201, at which an eLWA UE (e.g., the eLWA UE 130) can generate indication information that can indicate rate capability supported by the eLWA UE.

At 202, the eLWA UE can report the indication information to an LTE base station (e.g., the LTE base station 110).

At 203, the LTE base station can receive the indication information reported by the eLWA UE.

At 204, the LTE base station can configure a first rate for the eLWA UE based on the indication information that is greater than a second rate configured by a WLAN AP for the eLWA UE.

Note that, in some embodiments, 201 and 202 can be implemented separately by the eLWA UE, while 203 and 204 can be implemented separately by the LTE base station.

In some embodiments, using process 200 an eLWA UE (e.g., eLWA UE 130) that is in communication with a WLAN AP (e.g., WLAN AP 120) can generate indication information indicating the rate capability supported by the eLWA UE, and report the indication information to the LTE base station (e.g., LTE base station 110), then the LTE base station can configure the first rate for the eLWA UE according to the indication information, where the first rate is greater than the second rate configured by the WLAN AP for the eLWA UE. In some such embodiments, the eLWA UE can communicate with the WLAN AP at the second rate, and can communicate with the LTE base station at a third rate obtained by subtracting the second rate (at which the eLWA UE can communicate with the WLAN AP) from the first rate. In some such embodiments, this can facilitate load balancing between the LTE connection and the connection to the WLAN AP, whereas the eLWA UE may not otherwise communicate with both the LTE base station and the WLAN AP at the same time when the first rate is lower than the second rate.

Figure 3:
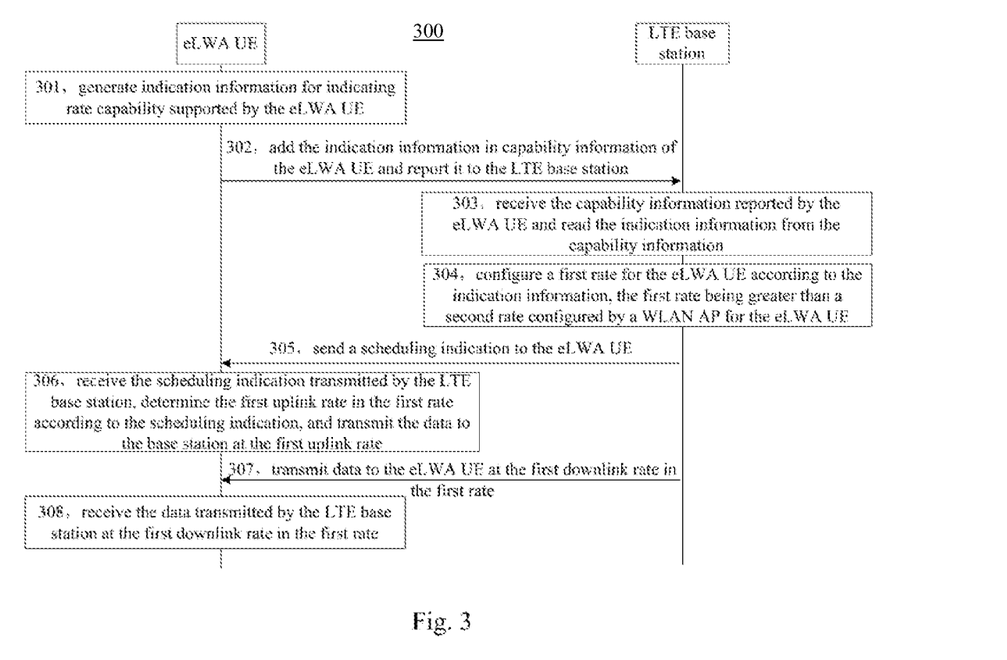
FIG. 3 is another flow chart of a rate configuration process in accordance with some embodiments of the disclosed subject matter.

FIG. 3 is another flow chart of a rate configuration process 300 in accordance with some embodiments of the disclosed subject matter. In some embodiments, process 200 can be used in connection with any suitable rate configuration system, such as rate configuration system 100. As shown in FIG. 3, the rate configuration process 300 can begin at 301, at which an eLWA UE (e.g., eLWA UE 130) can generate indication information that can indicate rate capability supported by the eLWA UE.

In general, the rate configured by the WLAN AP for the eLWA UE is relatively high (e.g., up to several Gigabits per second (Gbps)), while in comparison the rate configured by the LTE base station for the eLWA UE is relatively low (e.g., on the order of several megabits per second (Mbps)). The LTE base station schedules data to be transmitted to the eLWA UE by both the LTE base station and the WLAN AP, and determines which data is transmitted to the eLWA UE through the LTE base station, and which data is transmitted to the eLWA UE through the WLAN AP. Without information indicating what rate the WLAN AP has configured for the eLWA UE, the LTE base station limits the sum of rates at which the LTE base station and the WLAN AP transmit data to the UE at the same time to the rate configured by the LTE base station for the eLWA UE, and cannot meet the high rate requirements specified by eLWA. Accordingly, in order to comply with the requirements specified by eLWA, the LTE base station needs to configure a higher combined rate for the eLWA UE.

However, the LTE base station does not distinguish which UE is an eLWA UE and which UE is not, and the eLWA UE needs to report to the LTE base station indication information indicating the rate capability supported by the eLWA UE to enable the LTE base station to increase the rate configured for the eLWA UE.

In some embodiments, the indication information is an eLWA-Parameters parameter, and the eLWA-Parameters parameter is used to indicate that the eLWA UE supports simultaneous communication with the LTE base station and the WLAN AP. In some such embodiments, the UE sends the eLWA-Parameters parameter to the LTE base station indicating that the UE is an eLWA UE, and that simultaneous communication with the LTE base station and the WLAN AP is supported (i.e., the high rate is supported). Otherwise, if the UE does not send the eLWA-Parameters parameter to the LTE base station, that can indicate that the UE is not an eLWA UE, and that simultaneous communication with LTE base stations and WLAN AP is not supported (i.e., the high rate is not supported).

Additionally or alternatively, in some embodiments, the eLWA-Parameters parameter can be renamed. For example, a protocol version number can be added to the name of the eLWA-Parameters parameter. In a more particular example, if the protocol version number is v14xy, then the eLWA-Parameters parameter can be eLWA-Parameters-v14xy parameter. As another example, the name of the eLWA-Parameters parameter can be modified to a different name. Note that the parameter name eLWA-Parameters is merely a non-limiting example.

In some embodiments, the indication information can be used to indicate the rate capability supported by the eLWA UE and is not used to indicate the size of the first rate configured by the LTE base station for the eLWA UE (i.e., the rates configured by the LTE base station for all eLWA UEs may be the same default first rate). The rate configured by the LTE base station for the eLWA UE is sometimes referred to herein as the first rate.

In some embodiments, the first rate can include a first uplink rate and a first downlink rate, which may be different. When the first rate is a default rate, the first uplink rate and the first downlink rate are also default rates.

In some embodiments, indication information can include a ue-CategoryUL parameter that can indicate whether the UE supports simultaneous transmission of data to the LTE base station and the WLAN AP, and/or one or more rates. For example, the ue-CategoryUL parameter can have a first parameter value that indicates that the eLWA UE supports simultaneous transmission of data to the LTE base station and the WLAN AP, where the first parameter value being corresponds to the first uplink rate in the first rate, and the first uplink rate being greater than the second uplink rate in the second rate. As another example, the ue-CategoryDL parameter can have a second parameter value that indicates that the eLWA UE supports simultaneous reception of data transmitted by the LTE base station and the WLAN AP, the second parameter value corresponding to the first downlink rate in the first rate, and the first downlink rate being greater than the second downlink rate in the second rate.

In some embodiments, the indication information can be used to indicate the size of the first rate configured by the LTE base station for the eLWA UE. For example, the LTE base station can configure different first rates for different eLWA UEs according to the parameter values.

In some embodiments, the first rate includes the first uplink rate and the first downlink rate, but the first uplink rate and the first downlink rate are different. In some such embodiments, the eLWA UE can indicate the first uplink rate through the first parameter value, and indicate the first downlink rate through the second parameter value, respectively. Note that the first parameter value and the second parameter value are generally different, as uplink rates and downlink rates are generally different.

In some embodiments, the name of the ue-CategoryUL parameter can be modified (or different). For example, a protocol version number can be added to the name of the ue-CategoryUL parameter. In a more particular example, if the protocol version number is v14xy, the ue-CategoryUL parameter can be ue-CategoryUL-v14xy parameter. As another example, the name of the ue-CategoryUL parameter can be modified to a different name (e.g., something other than ue-CategoryUL). Note that the parameter name ue-CategoryUL is merely a non-limiting example.

At 302, the eLWA UE can add the indication information to capability information of the eLWA UE and report it to the LTE base station.

In some embodiments, the capability information can be used to report all the capabilities supported by the eLWA UE to the LTE base station. Since the indication information can be used for indicating at least the rate capability supported by the eLWA UE, the eLWA UE may add the indication information to the capability information to report it to the LTE base station.

For example, if the capability information is UE-EUTRA-Capability IE, the protocol version number is v14xy, and the capability information includes a laa-Parameters-v14xy parameter and a nonCriticalExtension parameter. In such an example, the capability information can be configured as shown below:

```
UE-EUTRA-Capability-v14xy-IEs ::= SEQUENCE {
    laa-Parameters-v14xy     LAA-Parameters-v14xy    OPTIONAL,
    eLWA-Parameters-v14xy    ELWA-Parameters-v14xy   OPTIONAL,
    nonCriticalExtension     SEQUENCE { }            OPTIONAL
}
```

As another example, the first parameter value and the second parameter value are both integers, and the first parameter value can be defined as INTEGER (x . . . y), the second parameter value may also be defined as INTEGER (x . . . y), and the first parameter value can be different from the second parameter value. In such an example, the capability information can be configured as shown below:

```
UE-EUTRA-Capability-v14xy-IEs ::= SEQUENCE {
    ue-CategoryDL-v14xy     INTEGER (x..y)          OPTIONAL,
    ue-CategoryUL-v14xy     INTEGER (x..y)          OPTIONAL,
    laa-Parameters-v14xy    LAA-Parameters-v14xy    OPTIONAL,
    nonCriticalExtension    SEQUENCE { }            OPTIONAL
}
```

As shown above, one or more of the parameters can be optional, such that they may or may not be included. For example, attributes of the ue-CategoryDL-v14xy parameter and ue-CategoryUL-v14xy parameter are OPTIONAL, so the capability information may include only the ue-CategoryDL-v14xy parameter, only the ue-CategoryUL-v14xy parameter, or both the ue-CategoryDL-v14xy parameter and the ue-CategoryUL-v14xy parameter.

Note that although the capability information is described above as only including the laa-Parameters-v14xy parameter and the nonCriticalExtension parameter, this is merely an example. The capability information may not include one or both of these parameters, and/or the capability information may include other information, which is not limited by the present disclosure.

At 303, the LTE base station can receive the capability information reported by the eLWA UE, and can read the indication information from the capability information.

At 304, the LTE base station can configure a first rate for the eLWA UE according to the indication information, the first rate being greater than a second rate configured by a WLAN AP for the eLWA UE.

Before the LTE base station configures the first rate for the eLWA UE, it may be necessary to obtain the second rate that is configured by the WLAN AP for the eLWA UE.

In some embodiments, the eLWA UE can obtain a second rate configured by the WLAN AP for the eLWA UE, send the second rate to the LTE base station, and the LTE base station can receive the second rate sent by the eLWA UE.

For example, after the eLWA UE has accessed to the WLAN AP and obtained the second rate configured by the WLAN AP for the eLWA UE, the eLWA UE can send the second rate directly to the LTE base station, and the LTE base station can receive the second rate.

In some embodiments, the LTE base station can obtain a second rate from the WLAN AP. For example, the LTE base station can communicate with the WLAN AP to which the eLWA UE is connected, and directly obtain the second rate configured by the WLAN AP for the eLWA UE from the WLAN AP.

In such an example, after acquiring the second rate, the LTE base station can configure for the eLWA UE a first rate greater than the second rate. When the first rate is relatively high, the third rate obtained by subtracting the second rate from the first rate is relatively large, and if the third rate is greater than the rate of several Mbps configured by the LTE base station for the UE, when the LTE base station sends data to the eLWA UE at the third rate, the eLWA UE may not be capable of processing the amount of data being received, and the eLWA UE may lose some of the data, resulting in packet loss. When the first rate is relatively low, the third rate obtained by subtracting the second rate from the first rate is relatively small, and if the third rate is less than the rate of several Mbps configured by the LTE base station for the UE, when the LTE base station sends data to the eLWA UE at the third rate, the processing resources of the eLWA UE may not be fully utilized, resulting in lower data transmission efficiency.

In some embodiments, the LTE base station can determine the first rate based on the second rate and the third rate. For example, the LTE base station can determine the first rate as the sum of the second rate and the third rate. As another example, the LTE base station can determine the first rate such that a difference between the first rate and the sum of the second rate and third rate is less than a preset threshold.

In some embodiments, after the LTE base station configures the first rate for the eLWA UE, it can notify the eLWA UE of the first rate, as described below in connection with 305 to 307.

At 305, the LTE base station can send a scheduling indication to the eLWA UE.

In some embodiments, if the LTE base station does not currently need to transmit data to the eLWA UE, the LTE base station can send a scheduling indication to the eLWA UE to indicate the first uplink rate.

At 306, the eLWA UE can receive the scheduling indication transmitted by the LTE base station, determine the first uplink rate in the first rate according to the scheduling indication, and transmit data to the base station at the first uplink rate.

At 307, the LTE base station can transmit data to the eLWA UE at the first downlink rate in the first rate.

In some embodiments, if the LTE base station needs to send data to the eLWA UE, the LTE base station can send data directly to the eLWA UE at the first downlink rate. As described above, the first downlink rate can be the sum of the rates at which the LTE base station simultaneously transmits data to the UE over LTE and the rate at which the LTE base station transmits data to the UE via the WLAN AP.

At 308, the eLWA UE can receive the data transmitted by the LTE base station at the first downlink rate in the first rate.

Note that in some embodiments, 301, 302, 306 and 308 can be implemented separately by the eLWA UE, while 303, 304, 305 and 307 can be implemented separately by the LTE base station.

In some embodiments (e.g., as described above in connection with FIG. 3), the eLWA UE can generate indication information indicating the rate capability supported by the eLWA UE and can report the indication information to the LTE base station by adding the indication information to the capability information of the eLWA UE, and the LTE base station can configure the first rate for the eLWA UE according to the indication information. As the first rate is greater than the second rate configured by the WLAN AP for the eLWA UE, the eLWA UE can communicate with the WLAN AP at the second rate, and can communicate with the LTE base station at a third rate obtained, for example, by subtracting the second rate from the first rate.

In some embodiments, the eLWA UE can send the second rate to the LTE base station. Additionally or alternatively, the LTE base station can obtain the second rate from the WLAN AP.

Figure 4:
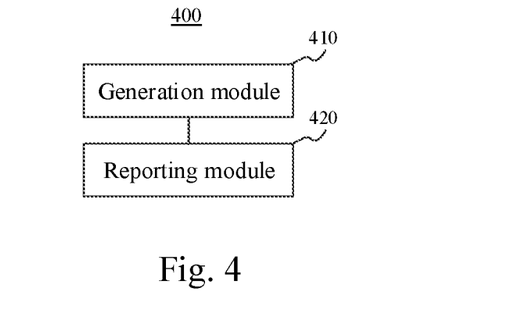
FIG. 4 is a block diagram of a rate configuration device in accordance with some embodiments of the disclosed subject matter.

FIG. 4 is a block diagram of a rate configuration device 400 in accordance with some embodiments of the disclosed subject matter. In some embodiments, the rate configuration device 400 can be implemented in an eLWA UE (e.g., eLWA UE 130). As shown in FIG. 4, in some embodiments, the rate configuration device 400 can include a generation module 410 and a reporting module 420.

In some embodiments, the generation module 410 can be configured to generate indication information for indicating a rate capability supported by the eLWA UE.

In some embodiments, the reporting module 420 can be configured to report the indication information generated by the generation module 410 to an LTE base station (e.g., LTE base station 110). As described above in connection with FIG. 3, the indication information can indicate a first rate of the eLWA UE, where the first rate is greater than a second rate configured by a WLAN AP (e.g., WLAN AP 120) for the eLWA UE.

For example, the eLWA UE can use the rate configuration device 400 to generate indication information indicating the rate capability supported by the eLWA UE and report the indication information to the LTE base station, and the LTE base station can configure the first rate for the eLWA UE according to the indication information, where the first rate is greater than the second rate configured by the WLAN AP for the eLWA UE. In such an example, the eLWA UE can communicate with the WLAN AP at the second rate, and can communicate with the LTE base station at a third rate obtained by subtracting the second rate from the first rate.

Figure 5:
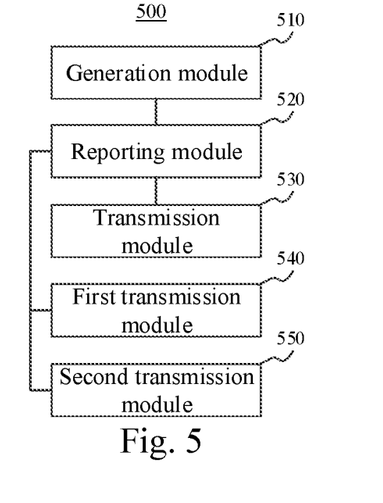
FIG. 5 is another block diagram of a rate configuration device in accordance with some embodiments of the disclosed subject matter.

FIG. 5 is a block diagram of a rate configuration device 500 in accordance with some embodiments of the disclosed subject matter. The rate configuration device 500 can be implemented in an eLWA UE (e.g., eLWA UE 130). As shown in FIG. 5, the rate configuration device 500 can include a generation module 510, and a reporting module 520.

In some embodiments, the generation module 510 can generate indication information for indicating a rate capability supported by the eLWA UE.

In some embodiments, the reporting module 520 can be configured to report the indication information generated by the generation module 510 to an LTE base station (e.g., LTE base station 110). As described above in connection with FIG. 3, the indication information can indicate a first rate of the eLWA UE, where the first rate is greater than a second rate configured by a WLAN AP (e.g., WLAN AP 120) for the eLWA UE.

Additionally or alternatively, in some embodiments, the reporting module 520 can add the indication information into capability information of the eLWA UE such that the indication information is reported to the LTE base station with the capability information.

In some embodiments, the rate configuration device 500 can include a transmission module 530 which can acquire the second rate configured by the WLAN AP for the eLWA UE, and transmit the second rate to the LTE base station.

In some embodiments, the indication information is an eLWA-Parameters parameter, and the eLWA-Parameters parameter can be used to indicate that the eLWA UE supports simultaneous communication with the LTE base station and the WLAN AP.

In some embodiments, the indication information can include a ue-CategoryUL parameter, and a first parameter value of the ue-CategoryUL parameter. The ue-CategoryUL parameter can be used to indicate that the eLWA UE supports simultaneous transmission of data to the LTE base station and the WLAN AP, and the first parameter value can correspond to a first uplink rate in the first rate, where the first uplink rate can be greater than a second uplink rate at which the eLWA UE can transmit data to the WLAN AP.

Additionally or alternatively, in some embodiments, the indication information can include a ue-CategoryDL parameter, and a second parameter value of the ue-CategoryDL parameter. The ue-CategoryDL parameter can be used to indicate that the eLWA UE supports simultaneous reception of data transmitted by the LTE base station and the WLAN AP, and the second parameter value can correspond to a first downlink rate in the first rate, where the first downlink can be greater than a second downlink rate at which the eLWA UE can transmit data to the WLAN AP.

In some embodiments, the rate configuration device 500 can include a first transmission module 540, and/or a second transmission module 550.

In some embodiments, the first transmission module 540 can be configured to receive a scheduling indication transmitted by the LTE base station, which can indicate a first uplink rate at which the eLWA UE can transmit data to the LTE base station (e.g., via both LTE and the WLAN AP).

Additionally or alternatively, in some embodiments, the second transmission module 550 can receive data transmitted by the LTE base station at the first downlink rate (e.g., via both LTE and the WLAN AP).

In some embodiments, the eLWA UE can use the rate configuration device 500 to generate indication information indicating the rate capability supported by the eLWA UE, and report the indication information to the LTE base station. The LTE base station can configure the first rate for the eLWA UE according to the indication information, where the first rate can be greater than the second rate configured by the WLAN AP for the eLWA UE. In some such embodiments, the eLWA UE can communicate with the WLAN AP at the second rate, and can communicate with the LTE base station at a third rate obtained by subtracting the second rate from the first rate.

In some embodiments, the eLWA UE can send the second rate to the LTE base station. Additionally or alternatively, the LTE base station can obtain the second rate from the WLAN AP.

Figure 6:
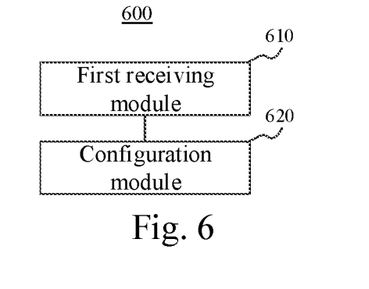
FIG. 6 is yet another block diagram of a rate configuration device in accordance with some embodiments of the disclosed subject matter.

FIG. 6 is a block diagram of a rate configuration device 600 in accordance with some embodiments of the disclosed subject matter. In some embodiments, the rate configuration device 600 can be implemented in an LTE base station (e.g., LTE base station 110). As shown in FIG. 6, the rate configuration device 600 can include a first receiving module 610, and a configuration module 620.

In some embodiments, the first receiving module 610 can receive indication information reported by an eLWA UE (e.g., eLWA UE 130), where the indication information can indicate a rate capability supported by the eLWA UE.

In some embodiments, the configuration module 620 can configure a first rate for the eLWA UE based on the indication information received by the first receiving module 610, where the first rate can be greater than a second rate configured by a WLAN AP (e.g., WLAN AP 120) for the eLWA UE.

In some embodiments, the rate configuration device 600 can receive, from the eLWA UE, indication information indicating the rate capability supported by the eLWA UE, and can configure the first rate for the eLWA UE according to the indication information, where the first rate can be greater than the second rate configured by the WLAN AP for the eLWA UE. In some such embodiments, the eLWA UE can communicate with the WLAN AP at the second rate, and can communicate with the LTE base station at a third rate obtained by subtracting the second rate from the first rate.

Figure 7:
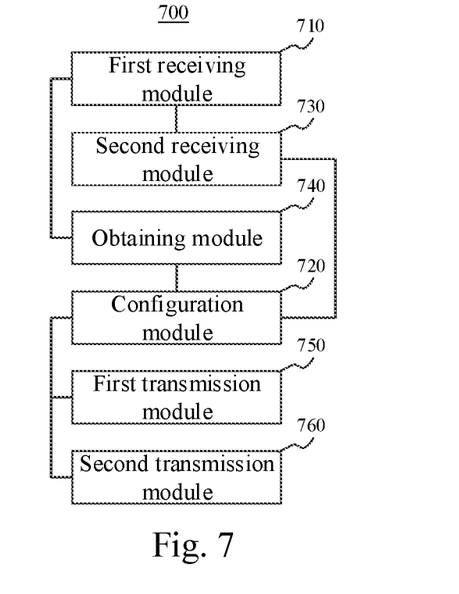
FIG. 7 is still another block diagram of a rate configuration device in accordance with some embodiments of the disclosed subject matter.

FIG. 7 is a block diagram of a rate configuration device 700 in accordance with some embodiments of the disclosed subject matter. In some embodiments, the rate configuration device can be implemented in an LTE base station (e.g., LTE base station 110). As shown in FIG. 7, the rate configuration device 700 can include a first receiving module 710, and a configuration module 720.

In some embodiments, the first receiving module 710 can receive indication information reported by an eLWA UE, where the indication information can indicate a rate capability supported by the eLWA UE.

In some embodiments, the configuration module 720 can configure a first rate for the eLWA UE based on the indication information received by the first receiving module 710, where the first rate can be greater than a second rate configured by a WLAN AP (e.g., WLAN AP 120) for the eLWA UE.

In some embodiments, the first receiving module 710 can receive capability information reported by the eLWA UE, which can include the indication information.

In some embodiments, the rate configuration device 700 can includes a second receiving module 730, and/or an obtaining module 740.

In some embodiments, the second receiving module 730 can receive a second rate transmitted by the eLWA UE.

Additionally or alternatively, in some embodiments, the obtaining module 740 can acquire a second rate from the WLAN AP.

In some embodiments, the indication information can be an eLWA-Parameters parameter, and the eLWA-Parameters parameter can be used to indicate that the eLWA UE supports simultaneous communication with the LTE base station and the WLAN AP.

In some embodiments, the indication information can include a ue-CategoryUL parameter and a first parameter value of the ue-CategoryUL parameter, where the ue-CategoryUL parameter can be used for indicating that the eLWA UE supports simultaneous transmission of data to the LTE base station and the WLAN AP, and the first parameter can correspond to a first uplink rate in the first rate that can be greater than a second uplink rate at which the eLWA UE can transmit data to the WLAN AP.

Additionally or alternatively, in some embodiments, the indication information can include a ue-CategoryDL parameter and a second parameter value of the ue-CategoryDL parameter, where the ue-CategoryDL parameter can be used for indicating that the eLWA UE supports simultaneous reception of data transmitted by the LTE base station and the WLAN AP, and the second parameter can correspond to a first downlink rate in the first rate which can be greater than a second downlink rate at which the eLWA UE can receive data from the WLAN AP.

In some embodiments, the rate configuration device can include a first transmission module 750, and/or a second transmission module 760.

In some embodiments, the first transmission module 750 can send a scheduling indication to the eLWA UE, where the scheduling indication can indicate a first uplink rate at which the eLWA UE can transmit data to the LTE base station (e.g., via both LTE and the WLAN AP).

Additionally or alternatively, in some embodiments, the second transmission module 760 can transmit data to the eLWA UE at a first downlink rate (e.g., via both LTE and the WLAN AP).

In some embodiments, the rate configuration device 700 can receive, from the eLWA UE, indication information indicating the rate capability supported by the eLWA UE, and the LTE base station can configure the first rate for the eLWA UE according to the indication information, where the first rate can be greater than the second rate configured by the WLAN AP for the eLWA UE. In some such embodiments, the eLWA UE can communicate with the WLAN AP at the second rate, and can communicate with the LTE base station at a third rate obtained by subtracting the second rate from the first rate.

In some embodiments, the LTE base station can use the rate configuration device 700 to receive a second rate from the eLWA UE, and/or the LTE base station can use the rate configuration device 700 to obtain a second rate from the WLAN AP.

In some embodiments, rate configuration devices described above in connection with FIGS. 4-7 can execute at least a portion of processes 200 and/or 300 described above in connection with FIGS. 2 and 3, respectively.

In some embodiments, a rate configuration device (e.g., rate configuration device 400 or 500) can be implemented in an eLWA UE (e.g., eLWA UE 130), and can execute at least a portion of processes 200 and/or 300 described above in connection with FIGS. 2 and 3, respectively. In some embodiments, such a rate configuration device can include a processor, and a memory for storing instructions executable by the processor.

In some embodiments, the processor can be configured (e.g., via the instructions) to generate indication information for indicating a rate capability supported by the eLWA UE, and report the indication information to an LTE base station, where the indication information can be used for indicating a first rate of the eLWA UE, which can be greater than a second rate configured by a WLAN AP (e.g., WLAN AP 120) for the eLWA UE In some embodiments, a rate configuration device (e.g., rate configuration device 600 or 700) can be implemented in an LTE base station (e.g., LTE base station 110), and can execute at least a portion of processes 200 and/or 300 described above in connection with FIGS. 2 and 3, respectively. In some embodiments, such a rate configuration device can includes a processor, and a memory for storing instructions executable by the processor.

In some embodiments, the processor can be configured to receive indication information reported by an eLWA UE (e.g., eLWA UE 130), where the indication information can be used for indicating a rate capability supported by the eLWA UE, and configure a first rate for the eLWA UE according to the indication information, which can be greater than a second rate configured by a WLAN AP (e.g., WLAN AP 120) for the eLWA UE.

Figure 8:
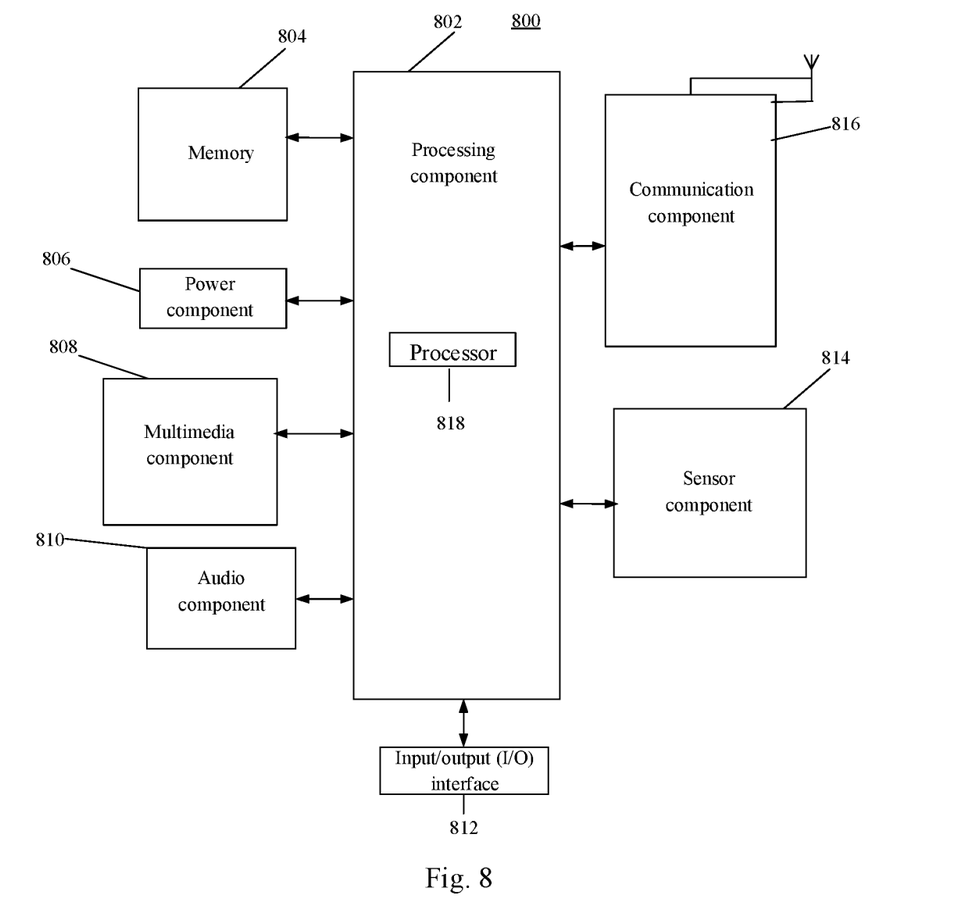
FIG. 8 is a block diagram of a device for rate configuration in accordance with some embodiments of the disclosed subject matter.

FIG. 8 is a block diagram of a device 800 for rate configuration in accordance with some embodiments of the disclosed subject matter. In some embodiments, device 800 can be any suitable computing device, such as a mobile phone (e.g., a smartphone), a personal computer, a digital broadcast terminal, a messaging device, a gaming console, a tablet computer, a medical device, exercise equipment, a personal digital assistant, etc.

As shown in FIG. 8, the device 800 can include, among other things, one or more of the following components: a processing component 802, a memory 804, a power component 806, a multimedia component 808, an audio component 810, an input/output (I/O) interface 812, a sensor component 814, and a communication component 816.

In some embodiments, the processing component 802 can control overall operations of the device 800, such as the operations associated with display, telephone calls, data communications, camera operations, recording operations, etc. The processing component 802 can include one or more processors 818 to execute instructions to perform all or part of the processes described herein (e.g., processes 200 and/or 300 described above in connection with FIGS. 2 and 3). Additionally, in some embodiments, the processing component 802 can include one or more modules which facilitate interaction between the processing component 802 and other components. For example, the processing component 802 can include a multimedia module to facilitate interaction between the multimedia component 808 and the processing component 802.

In some embodiments, the memory 804 can be configured to store various types of data to support operation of the device 800. Examples of such data can include instructions for any applications and/or processes executed by the device 800, contact data, phonebook data, messages, pictures, videos, etc. The memory 804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

In some embodiments, the power component 806 can provide power to various components of the device 800. The power component 806 can include, for example, a power management system, one or more power sources, and/or any other components associated with the generation, management, and distribution of power in the device 800.

In some embodiments, the multimedia component 808 can include a screen providing an output interface between the device 800 and a user. In some embodiments, the screen can include a liquid crystal display (LCD) and a touch panel. If the screen includes a touch panel, the screen can be implemented as a touch screen to receive input signals from a user. In some embodiments, the touch panel can include one or more touch sensors to sense touches, swipes, gestures, etc., on the touch panel. In some embodiments, the touch sensors can sense a boundary of a touch or swipe action, and can sense a period of time and/or a pressure associated with the touch or swipe action. In some embodiments, the multimedia component 808 can include a front camera and/or a rear camera. In some embodiments, the front camera and/or the rear camera can receive external light while the device 800 is in an operation mode, such as a photographing mode or a video mode. Each of the front camera and the rear camera can be configured with a fixed optical lens system, or have focus and optical zoom capability.

In some embodiments, the audio component 810 can be configured to output and/or input audio signals. For example, the audio component 810 can includes a microphone (MIC) that can be configured to receive an external audio signal when the device 800 is in an operation mode, such as a call mode, a recording mode, and/or a voice recognition mode. In some embodiments, the received audio signal can be stored in the memory 804 and/or transmitted via the communication component 816. In some embodiments, the audio component 810 can include a speaker to output audio signals.

In some embodiments, the I/O interface 812 can provide an interface between the processing component 802 and peripheral interface modules, such as a keyboard, a mouse, a click wheel, one or more buttons, etc. The buttons can include, for example, a home button, a volume button, a start button, a lock button, etc.

In some embodiments, the sensor component 814 can include one or more sensors to provide status assessments of various aspects of the device 800. For example, the sensor component 814 can detect an open/closed status of the device 800, relative positioning of components (e.g., the display and the keyboard) of the device 800, a change in position of the device 800 and/or a component of the device 800, a presence or absence of user contact with the device 800, an orientation and/or an acceleration/deceleration of the device 800, a change in temperature of the device 800, etc. In some embodiments, the sensor component 814 can include a proximity sensor configured to detect the presence of nearby objects without any physical contact. In some embodiments, the sensor component 814 can include a light sensor, such as a CMOS or CCD image sensor, for use in imaging applications. In some embodiments, the sensor component 814 can include an accelerometer sensor, a gyroscope sensor, a magnetic sensor, a pressure sensor, a temperature sensor, etc.

In some embodiments, the communication component 816 can be configured to facilitate wired and/or wireless communication between the device 800 and one or more other devices. For example, the device 800 can access a wireless network using any suitable communication standard, such as Wi-Fi, 2G; 3G 4G LTE, etc., and any suitable combination thereof. In some embodiments, the communication component 816 can receive a broadcast signal or broadcast associated information from an external broadcast management system via a broadcast channel. In some embodiments, the communication component 816 can includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and/or any other suitable technologies.

In some embodiments, the device 800 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, any other suitable electronic components, or any suitable combination thereof, for executing one or more processes described herein (e.g., one or more portions of processes 200 and/or 300 described above in connection with FIGS. 2 and 3).

In some embodiments, device 800 can include any suitable non-transitory computer-readable storage medium including instructions, such as the memory 804 including instructions, which can be executable by the processor 818, for performing one or more processes described herein (e.g., one or more portions of processes 200 and/or 300 described above in connection with FIGS. 2 and 3). For example, the non-transitory computer-readable storage medium can be one or more of a ROM, a RAM, a CD-ROM, a magnetic tape, a floppy disc, an optical data storage device, SRAM, EEPROM, EPROM, PROM, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims. It should be understood that the above described steps of the processes of FIGS. 2 and 3 can be executed or performed in any order or sequence not limited to the order and sequence shown and described in the figures. Also, some of the above steps of the processes of FIGS. 2 and 3 can be executed or performed substantially simultaneously where appropriate or in parallel to reduce latency and processing times.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A rate configuration method for an enhanced long term evolution (LTE)-wireless local area network (WLAN) aggregation (eLWA) user equipment (UE), the method comprising:
   generating, by the eLWA UE, indication information that indicates a rate capability supported by the eLWA UE;
   reporting, by the eLWA UE, the indication information to an LTE base station, wherein a first rate is configured by the LTE base station for the eLWA UE based on the indication information;
   obtaining, by the eLWA UE, a second rate configured by the WLAN AP for the eLWA UE;
   transmitting, by the eLWA UE, the second rate to the LTE base station; and
   when the first rate is greater than the second rate, communicating, by the eLWA UE, with LTE base station at a third rate, wherein the third rate is obtained by subtracting the second rate from the first rate.

2. The method of claim 1, wherein reporting the indication information to the LTE base station comprises reporting the indication information to the LTE base station by adding the indication information to capability information of the eLWA UE.

3. The method of claim 1, wherein the indication information comprises an eLWA-Parameters parameter that indicates that the eLWA UE supports simultaneous communication with the LTE base station and the WLAN AP.

4. The method of claim 1, wherein the indication information comprises:
a ue-CategoryUL parameter and a first parameter value of the ue-CategoryUL parameter, wherein the ue-CategoryUL parameter indicates that the eLWA UE supports simultaneous transmission of data to the LTE base station and the WLAN AP, the first parameter value corresponds to a first uplink rate in the first rate, and the first uplink rate is greater than a second uplink rate at which the eLWA UE communicates data to the WLAN AP; or,
a ue-CategoryDL parameter and a second parameter value of the ue-CategoryDL parameter, wherein the ue-CategoryDL parameter indicates that the eLWA UE supports simultaneous reception of data transmitted by the LTE base station and the WLAN AP, the second parameter value corresponds to a first downlink rate in the first rate, and the first downlink rate is greater than a second downlink rate at which the eLWA UE receives data from the WLAN AP.

5. The method of claim 1, further comprising:
receiving, by the eLWA UE, a scheduling indication transmitted by the LTE base station,
determining a first uplink rate based on the scheduling indication, and transmitting data to the LTE base station at the first uplink rate; or,
receiving data transmitted by the LTE base station at a first downlink rate in the first rate.

6. A rate configuration method for a long term evolution (LTE) base station, the method comprising:
receiving, at the LTE base station, indication information reported by an enhanced LTE-wireless local area network (WLAN) aggregation (eLWA) user equipment (UE), wherein the indication information indicates a rate capability supported by the eLWA UE;
configuring, by the LTE base station, a first rate for the eLWA UE based on the indication information;
receiving, by the LTE base station, a second rate that is configured by a WLAN access point (AP) for the eLWA UE; and
when the first rate is greater than the second rate, communicating, by the eLWA UE, with LTE base station at a third rate wherein the third rate is obtained by subtracting the second rate from the first rate.

7. The method of claim 6, wherein receiving the indication information reported by the eLWA UE, comprises:
receiving capability information reported by the eLWA UE; and
reading the indication information from the capability information.

8. The method of claim 6, wherein:
the second rate is transmitted by the eLWA UE; or
the second rate is transmitted by the WLAN AP.

9. The method of claim 6, wherein the indication information is an eLWA-Parameters parameter that indicates that the eLWA UE supports simultaneous communication with the LTE base station and the WLAN AP.

10. The method of claim 6, wherein the indication information comprises:
a ue-CategoryUL parameter and a first parameter value of the ue-CategoryUL parameter, wherein the ue-CategoryUL parameter indicates that the eLWA UE supports simultaneous transmission of data to the LTE base station and the WLAN AP, the first parameter value corresponds to a first uplink rate in the first rate, and the first uplink rate is greater than a second uplink rate at which the eLWA UE communicates data to the WLAN AP; or,
a ue-CategoryDL parameter and a second parameter value of the ue-CategoryDL parameter, wherein the ue-CategoryDL parameter indicates that the eLWA UE supports simultaneous reception of data transmitted by the LTE base station and the WLAN AP, the second parameter value corresponds to a first downlink rate in the first rate, and the first downlink rate is greater than a second downlink rate at which the eLWA UE receives data from the WLAN AP.

11. The method of claim 6, further comprising:
transmitting, by the LTE base station, a scheduling indication to the eLWA UE, the scheduling indication that indicates a first uplink rate in the first rate such that the eLWA UE transmits data to the LTE base station at the first uplink rate; or,
transmitting, by the LTE base station, data to the eLWA UE at a first downlink rate in the first rate.

12. A rate configuration device for an enhanced long term evolution (LTE)-wireless local area network (WLAN) aggregation (eLWA) user equipment (UE), the rate configuration device comprising:
one or more processors; and
a non-transitory computer-readable storage medium configured to store instructions executable by the one or more processors;
wherein execution of the instructions causes the one or more processors to:
generate indication information that indicates a rate capability supported by the eLWA UE;
report the indication information to an LTE base station, wherein a first rate is configured by the LTE base station for the eLWA UE based on the indication information;
obtaining a second rate configured by the WLAN AP for the eLWA UE;
transmitting the second rate to the LTE base station; and
when the first rate is greater than the second rate, communicating, by the eLWA UE, with LTE base station at a third rate, wherein the third rate is obtained by subtracting the second rate from the first rate.

13. The rate configuration device of claim 12, wherein execution of the instructions further causes the one or more processors to report the indication information to the LTE base station by adding the indication information to capability information of the eLWA UE.

14. The rate configuration device of claim 12, wherein the indication information comprises an eLWA-Parameters parameter that indicates that the eLWA UE supports simultaneous communication with the LTE base station and the WLAN AP.

15. The rate configuration device of claim 12, wherein the indication information comprises:
a ue-CategoryUL parameter and a first parameter value of the ue-CategoryUL parameter, wherein the ue-CategoryUL parameter indicates that the eLWA UE supports simultaneous transmission of data to the LTE base station and the WLAN AP, the first parameter value corresponds to a first uplink rate in the first rate, and the first uplink rate is greater than a second uplink rate at which the eLWA UE communicates data to the WLAN AP; or,
a ue-CategoryDL parameter and a second parameter value of the ue-CategoryDL parameter, wherein the ue-CategoryDL parameter indicates that the eLWA UE supports simultaneous reception of data transmitted by the LTE base station and the WLAN AP, the second parameter value corresponds to a first downlink rate in the first rate, and the first downlink rate is greater than a second downlink rate at which the eLWA UE receives data from the WLAN AP.

16. The rate configuration device of claim 12, wherein execution of the instructions further causes the one or more processors to:
receive a scheduling indication transmitted by the LTE base station, to determine a first uplink rate based on the scheduling indication, and to transmit data to the LTE base station at the first uplink rate; or,
receive data transmitted by the LTE base station at a first downlink rate in the first rate.

17. A rate configuration device for a long term evolution (LTE) base station, the device comprising:
one or more processors; and
a non-transitory computer-readable storage medium configured to store instructions executable by the one or more processors;
wherein execution of the instructions causes the one or more processors to:
receive indication information reported by an enhanced LTE-wireless local area network (WLAN) aggregation (eLWA) user equipment UE, wherein the indication information indicates a rate capability supported by the eLWA UE;
configure a first rate for the eLWA UE based on the indication information, receiving, by the LTE base station, a second rate that is configured by a WLAN access point (AP) for the eLWA UE; and
when the first rate is greater than the second rate, communicating, by the eLWA UE, with LTE base station at a third rate, wherein the third rate is obtained by subtracting the second rate from the first rate.

18. The rate configuration device of claim 17, wherein execution of the instructions further causes the one or more processors to:
receive capability information reported by the eLWA UE; and
read the indication information from the capability information.

19. The rate configuration device of claim 17, wherein the second rate is transmitted by the eLWA UE; or,
the second rate is transmitted by the WLAN AP.

20. The rate configuration device of claim 17, wherein the indication information comprises an eLWA-Parameters parameter that indicates that the eLWA UE supports simultaneous communication with the LTE base station and the WLAN AP.

21. The rate configuration device of claim 17, wherein the indication information comprises:
a ue-CategoryUL parameter and a first parameter value of the ue-CategoryUL parameter, wherein the ue-CategoryUL parameter indicates that the eLWA UE supports simultaneous transmission of data to the LTE base station and the WLAN AP, the first parameter value corresponds to a first uplink rate in the first rate, and the first uplink rate is greater than a second uplink rate at which the eLWA UE communicates data to the WLAN AP; or,
a ue-CategoryDL parameter and a second parameter value of the ue-CategoryDL parameter, wherein the ue-CategoryDL parameter indicates that the eLWA UE supports simultaneous reception of data transmitted by the LTE base station and the WLAN AP, the second parameter value corresponds to a first downlink rate in the first rate, and the first downlink rate is greater than a second downlink rate at which the eLWA UE receives data from the WLAN AP.

22. The rate configuration device of claim 17, wherein execution of the instructions further causes the one or more processors to:
transmit a scheduling indication to the eLWA UE, the scheduling indication indicating a first uplink rate in the first rate such that the eLWA UE transmits data to the LTE base station at the first uplink rate; or,
transmit data to the eLWA UE at a first downlink rate in the first rate.

* * * * *